W. G. HARPER.
MOTOR ASSEMBLING AND TESTING STAND.
APPLICATION FILED MAR. 28, 1919.
1,322,787.
Patented Nov. 25, 1919.
3 SHEETS—SHEET 1.
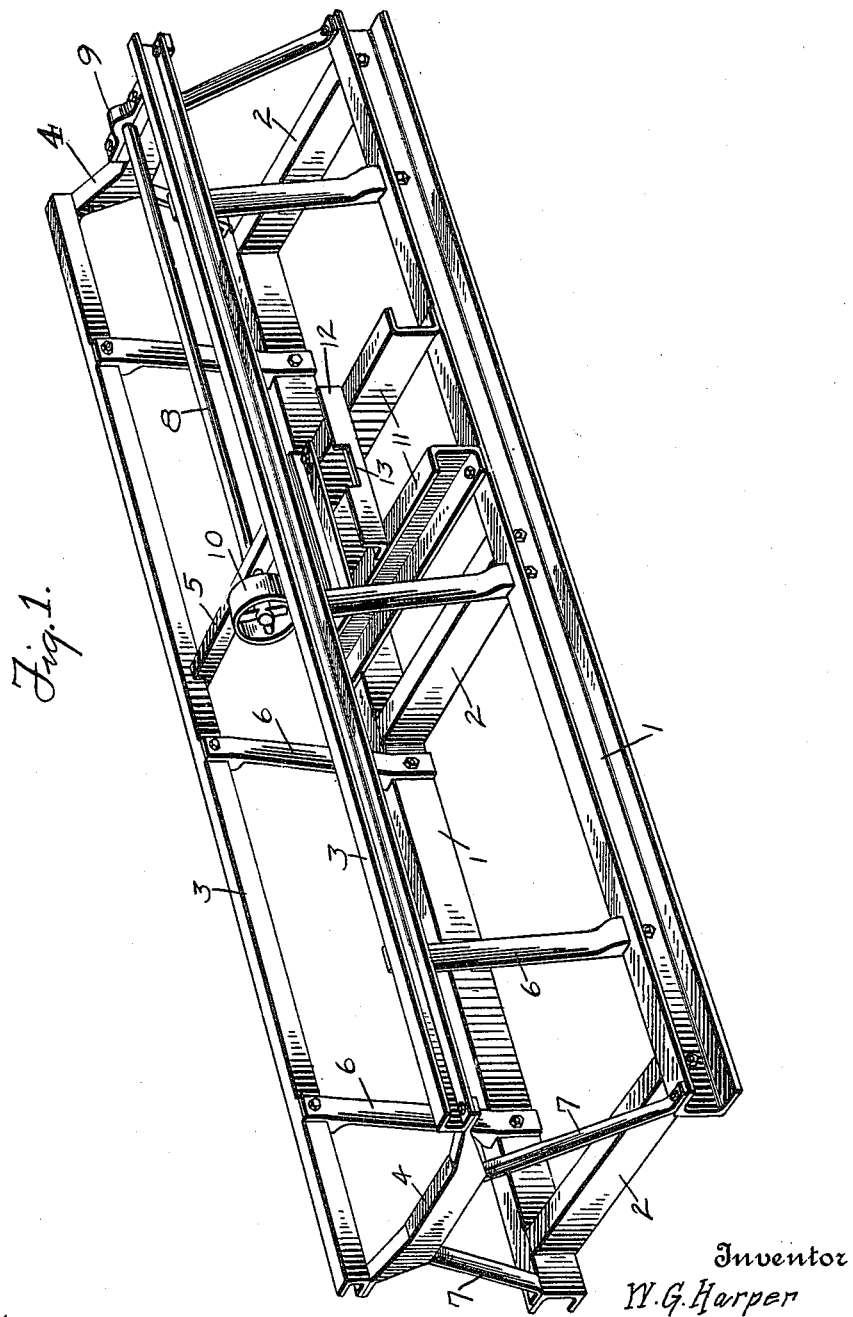

W. G. HARPER.
MOTOR ASSEMBLING AND TESTING STAND.
APPLICATION FILED MAR. 28, 1919.
1,322,787.
Patented Nov. 25, 1919.
3 SHEETS—SHEET 2.
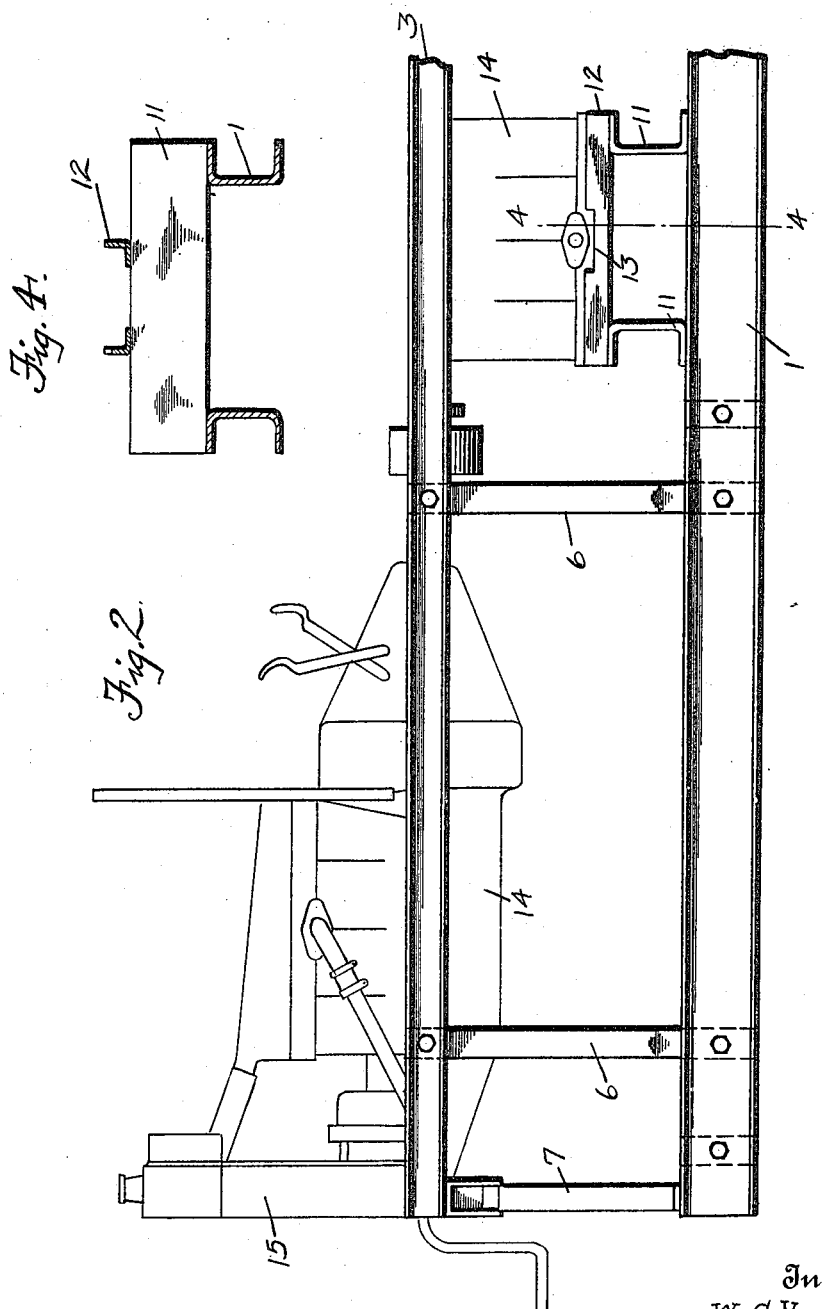
Inventor
W. G. Harper

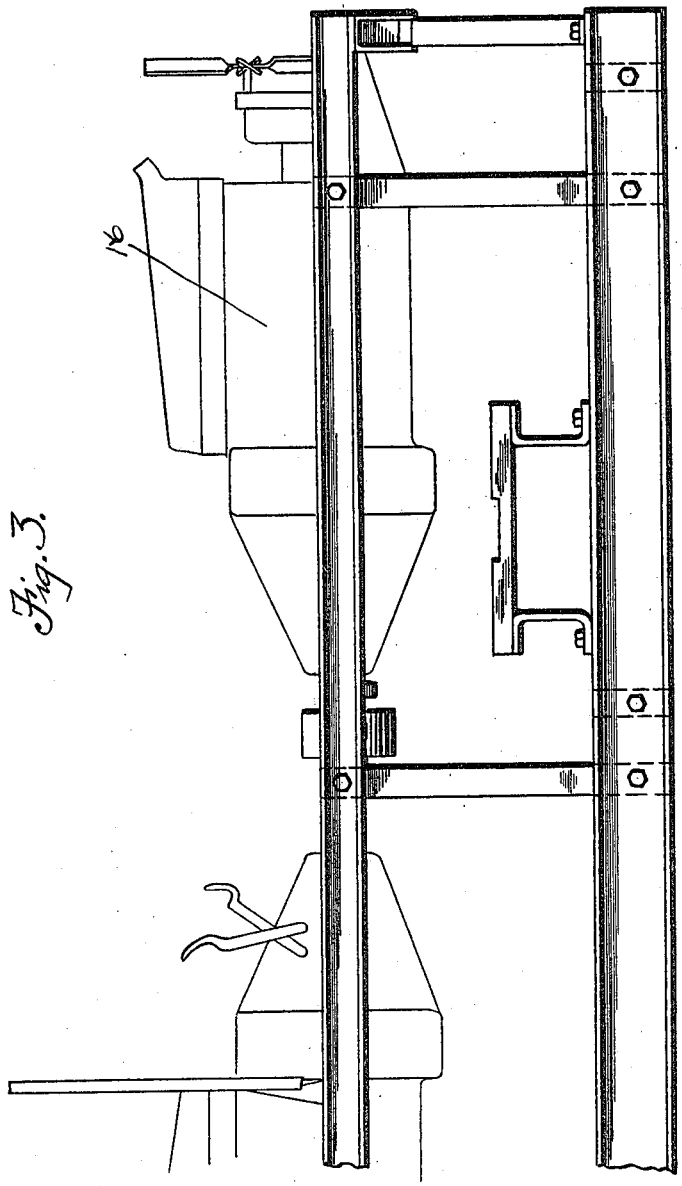

UNITED STATES PATENT OFFICE.

WILLIAM GIVEN HARPER, OF CARLISLE, KENTUCKY.

MOTOR ASSEMBLING AND TESTING STAND.

1,322,787.

Specification of Letters Patent.  Patented Nov. 25, 1919.

Application filed March 28, 1919. Serial No. 285,855.

*To all whom it may concern:*

Be it known that I, WILLIAM GIVEN HARPER, a citizen of the United States, and a resident of Carlisle, in the county of Nicholas and State of Kentucky, have invented certain new and useful Improvements in Motor Assembling and Testing Stands, of which the following is a specification.

My invention is an improvement in stands of the character specified, and has for its object to provide a stand which may be used for adjusting the bearings of a motor to the crank shaft by heating, termed "burning in," and for loosening the bearings by turning the same with a motor after they have been "burned in," termed "running in," and for assembling and testing the motor.

In the drawings:

Figure 1 is a perspective view of the improved stand;

Fig. 2 is a side view with the parts arranged for "burning in";

Fig. 3 is a view similar to Fig. 2, with the parts arranged for "running in";

Fig. 4 is a section on the line 4—4 of Fig. 2.

The improved stand comprises a base consisting of longitudinally extending channel plates 1 connected by cross plates 2 also of channel material and arranged at the ends and intermediate the ends.

A superstructure is arranged above the stand, the said superstructure consisting of channel bars 3 arranged in spaced parallel relation and connected at their ends by brackets 4 and intermediate their ends by a cross bar 5. The channel bars are spaced to correspond with the spacing of the side bars of the frame of an automobile, and they are supported from the channel plates 1 by standards 6.

The brackets 4 are below the level of the channel bars 3, and are also supported from the channel plates 1 by inclined braces 7. The base of the stand is, in practice, wider than the superstructure to provide a stand that will be well braced laterally, and a shaft 8 is journaled in a sectional bearing 9 on one of the brackets and in the cross bar 5, the said shaft having a pulley 10 at its inner end.

A support for a motor block is arranged on the base. This support consists of a pair of channel bars 11 arranged in spaced parallel relation transversely of the channel plates 1, and the channel bars are connected by angle plates 12, the said plates being arranged upon the channel bars 11 and extending longitudinally of the stand as shown. Each channel bar has its vertical portion notched intermediate its ends, as indicated at 13, and these plates are adapted to support a motor block indicated at 14.

In the use of the improved stand, for "burning in" it is arranged as shown in Fig. 2. By the term "burning in" is meant adjusting the bearings of a motor to the crank shaft by heating. This is done by adjusting the bearings to the crank to, say, eight one-thousandths of an inch. The bearings are then tightened and, leaving the bearings dry, that is, unlubricated, the motor block, indicated at 14, is clamped to the support 11—12 and the crank is rotated by power until the heat generated by friction melts the metal in the bearing and flows the same around the crank, making a perfect bearing. In order to rotate the crank shaft a motor, indicated at 14, is mounted on the frame, the said motor being an ordinary Ford motor, for instance, provided with a radiator 15.

After "burning in," and after the motor has been completely assembled, the bearings are yet too tight to be cranked or turned over by hand. Hence it must be turned over by power. After being turned over, it is run under its own power until thoroughly limbered so that it can be cranked by hand after being installed in the car. In "running in," the motor 16 to be run in is mounted as shown in Fig. 3, being at the opposite end from the motor 14.

In assembling and testing, the motor may be assembled directly on the stand and may be tested there under its own power. The shaft 8 and pulley 10 are for connection with a line shaft for general power purposes.

The improvement is also designed for testing and running in Ford rear systems after being overhauled.

I claim:

A stand of the character specified comprising a base frame composed of side channel plates rigidly connected in spaced relation with their channels outward, a superstructure composed of channel plates spaced apart from each other, with their channels outward a less distance than the spacing of the base side plates, posts connecting the last named side plates with the base, cross bars connecting the last named channel plates and dropped below said channel plates between the same, braces connecting said cross bars with the base, said base having a stand for a motor block near one end, and a power shaft journaled above the stand.

WILLIAM GIVEN HARPER.

Witnesses:
L. W. CLARK,
JNO. M. MATHIAS.